(12) United States Patent
Chen et al.

(10) Patent No.: US 7,519,842 B2
(45) Date of Patent: Apr. 14, 2009

(54) SYSTEM AND METHOD FOR NETWORK INTERFACE POWER MANAGEMENT

(75) Inventors: Qijun Chen, The Woodlands, TX (US);
Rahul Lakdawala, Cypress, TX (US);
Ronald E. DeLuga, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

(21) Appl. No.: 10/922,099

(22) Filed: Aug. 19, 2004

(65) Prior Publication Data

US 2006/0040715 A1 Feb. 23, 2006

(51) Int. Cl.
*G06F 1/26* (2006.01)
(52) U.S. Cl. .................. 713/310; 713/323; 340/531; 340/568.2
(58) Field of Classification Search .......... 713/310, 713/323, 324, 320; 323/318; 340/531, 568.2
See application file for complete search history.

(56) References Cited

U.S. PATENT DOCUMENTS

| | | | |
|---|---|---|---|
| 4,491,792 A * | 1/1985 | Bullock et al. ............. 324/157 |
| 4,922,448 A * | 5/1990 | Kunieda et al. ............ 713/320 |
| 5,408,669 A * | 4/1995 | Stewart et al. ............. 713/300 |
| 5,463,261 A * | 10/1995 | Skarda et al. .............. 307/131 |
| 5,659,594 A * | 8/1997 | Toda ........................ 455/550.1 |
| 5,768,605 A * | 6/1998 | Fuller et al. ................ 713/324 |
| 5,822,594 A | 10/1998 | Leung |
| 6,026,494 A * | 2/2000 | Foster ....................... 713/320 |
| 6,108,312 A | 8/2000 | Voloshin |
| 6,198,944 B1 * | 3/2001 | Hollenbach et al. ......... 455/557 |
| 6,218,930 B1 | 4/2001 | Katzenberg et al. |
| 6,338,142 B1 | 1/2002 | Alsaadi |
| 6,535,983 B1 | 3/2003 | McCormack et al. |
| 6,640,272 B1 | 10/2003 | Hartwell et al. |
| 6,725,177 B2 | 4/2004 | David et al. |
| 2007/0141869 A1 * | 6/2007 | McNeely et al. ........... 439/76.1 |

FOREIGN PATENT DOCUMENTS

| | | |
|---|---|---|
| CN | 2435791 | 6/2001 |
| JP | 11085347 | 3/1999 |
| JP | 11143446 | 5/1999 |
| JP | 2000340306 | 8/2000 |
| TW | 411679 | 11/2000 |
| TW | 200307416 | 12/2003 |
| WO | WO96/12999 | 5/1996 |

OTHER PUBLICATIONS

TW Search Report, date of completion Mar. 18, 2008; TW appln No. 94124505; corresponding U.S. Appl. No. 10/922,099.
Chinese office action issued Aug. 22, 2008; CN appln No. 200510092082.8 referencing CN2435791Y; corresponding U.S. Appl. No. 10/922,099.

* cited by examiner

*Primary Examiner*—Thuan N Du (57) ABSTRACT

Disclosed are a sensor for detecting when an infrastructure interface is physically coupled to network infrastructure, and infrastructure connection detection circuitry coupled to the sensor. The infrastructure connection detection circuitry provides a power management control signal as a function of a signal from the sensor.

38 Claims, 3 Drawing Sheets

SYSTEM AND METHOD FOR NETWORK INTERFACE POWER MANAGEMENT

FIELD OF INVENTION

This disclosure is related generally to power management and, more specifically, to network interface power management.

DESCRIPTION OF RELATED ART

Computing systems and communication devices today have become highly mobile and readily portable. For example, portable computers (e.g., laptop computers, notebook computers, etcetera), personal digital assistants (PDAs), palm top computers, wireless personal communication terminals (e.g., the BLACKBERRY wireless personal communication terminal available from Research In Motion), cellular telephones, and the like (collectively referred to herein as portable information processing systems) are in wide spread use for both business and personal use. In order to facilitate mobility, such portable information processing systems have typically been provided with a self-contained power supply system, such as in the form of a battery. To facilitate portability, such power supply systems must often be relatively small and/or lightweight so as not to unnecessarily add to the overall size and weight of the portable information processing system. Unfortunately, reduction in the size and/or weight of such power supply systems is at the expense of energy reserves available from the power supply. For example, a portable computer may utilize a relatively small lithium-ion battery as a self-contained power supply system to provide an acceptably small notebook form factor having a reasonably long period of self-contained operation, e.g., 2-3 hours.

Information communication infrastructure, such as may include local area networks (LANs), the public switched telephone network (PSTN), metropolitan area networks (MANs), wide area networks (WANs), intranets, extranets, the Internet, and the like (referred to collectively herein as (networks), has become widely available in recent years. Accordingly, portable information processing systems are often provided with information communication interfaces, such as Ethernet interfaces, Token Ring interfaces, universal serial bus (USB) interfaces, modems, fiber optic interfaces, and the like, to provide connectivity with a network comprising one or more systems. Although remaining unused much of the time portable information processing systems are mobile, the forgoing information communication interfaces remain a useful part of the portable information processing systems to provide desired information communication (often high-speed information communication) when network infrastructure is available. For example, a user of a portable computer may use a built-in network interface card (NIC) and a network connection at his or her office location to use company resources such as file servers and printers. Additionally, the user of the portable computer may avail himself or herself of a high-speed Internet connection for electronic mail access at a hotel while traveling using the same NIC. However, at other times the NIC may remain unused, and quite likely unconnected to network infrastructure. Such NICs, whether in use or not, are a significant source of energy consumption and, therefore, can have an appreciable impact upon the period of self-contained operation available using a self-contained power supply.

Implementation of energy conservation techniques, such as slowing down processing speeds, turning off display monitor backlights, turning off disk drive motors etcetera, may be implemented in portable information processing systems in order to optimize the period of self-contained operation available before the self-contained power supply is exhausted (e.g., the self-contained power supply must be replaced or replenished). For example, NICs which have been implemented in portable computer platforms have implemented an energy conservation technique wherein the physical layer is monitored for communication traffic and, when no communication traffic is detected for a predetermined period of time, some circuitry of the NIC is placed in a low-power state. However, the foregoing energy optimization technique continues to result in a significant amount of energy being consumed by the NIC as the physical layer circuitry, as well as other logic and control circuitry, remains active in order to be able to detect the onset of communication traffic for power-up operation.

BRIEF SUMMARY OF THE INVENTION

Embodiments disclosure herein provide a system comprising a sensor for detecting when an infrastructure interface is physically coupled to network infrastructure, and infrastructure connection detection circuitry coupled to the sensor. The infrastructure connection detection circuitry of this embodiment provides a power management control signal as a function of a signal from the sensor.

Another embodiment provides a system comprising network interface circuitry providing information communication between a portable information processing system and a network, an infrastructure interface for coupling the network interface circuitry and the network for the information communication, a sensor for detecting when the infrastructure interface is physically coupled to a mating connector, and infrastructure connection detection circuitry coupled to the sensor. The infrastructure connection detection circuitry of this embodiment provides a power management control signal as a function of a signal from the sensor.

Further embodiments provide a method comprising receiving a sensor signal indicative of when an infrastructure interface is physically coupled to network infrastructure, determining if the infrastructure interface is physically coupled to the network infrastructure as a function of the sensor signal, and providing a power management control signal to alter a powered state of network interface circuitry when a condition of the infrastructure interface with respect to being physically coupled to the network infrastructure is determined to have changed.

A still further embodiment provides a system comprising means for detecting if an infrastructure interface is physically coupled to a mating connector, and means for providing a power management control signal when the means for detecting indicates the infrastructure interface has changed a condition with respect to being physically coupled to the network infrastructure.

DETAILED DESCRIPTION

Figure 1:
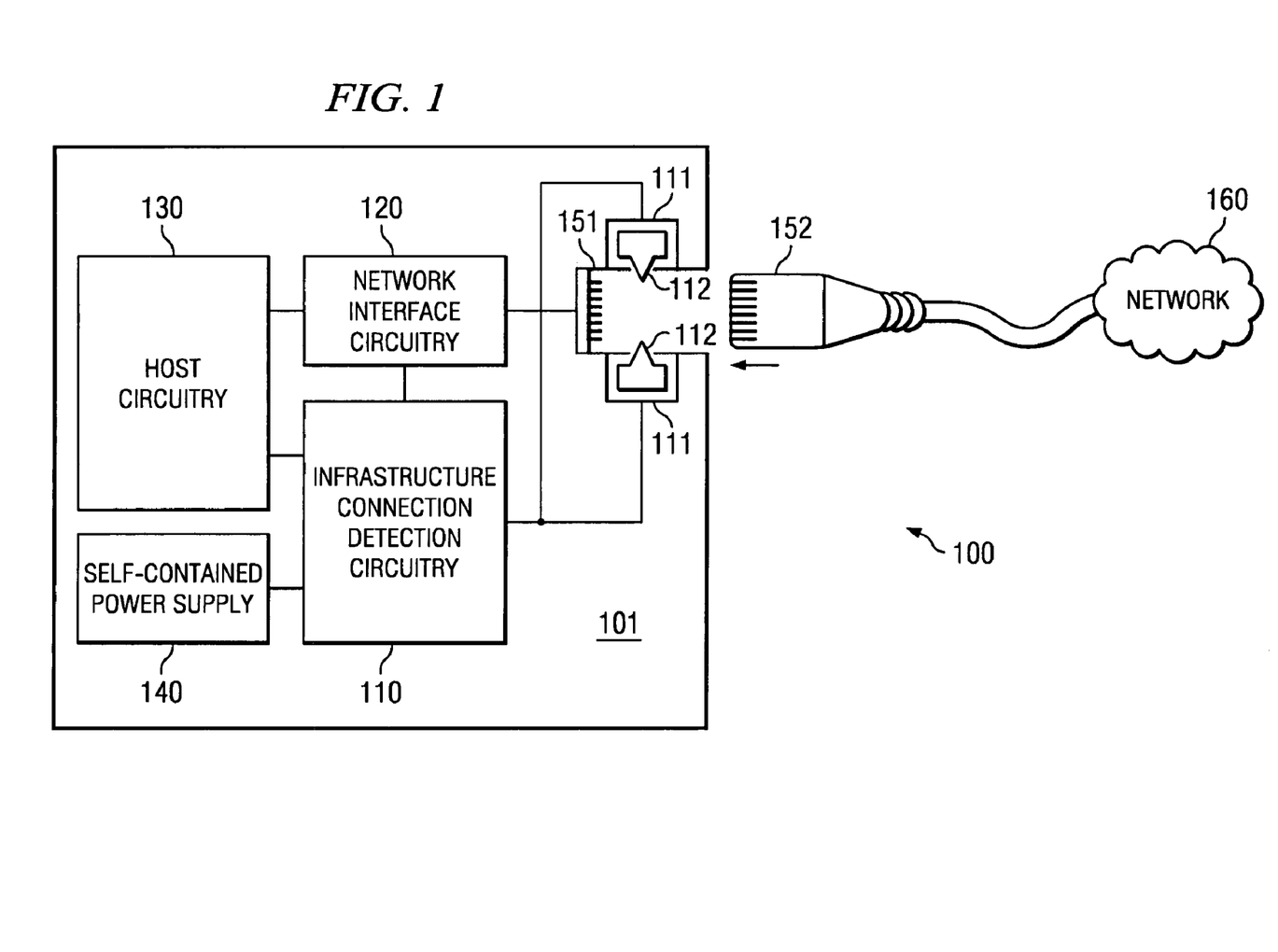
FIG. 1 shows a block diagram of a portable information processing system adapted according to an embodiment.

Directing attention to FIG. 1, system 100 is shown in which portable information processing system 101 is adapted according to one embodiment. Portable information processing system 101 of the illustrated embodiment represents any number of portable information processing platforms, such as a portable computer, a PDA, a palm top computer, a wireless personal communication terminal, a cellular telephone, etcetera, which may be coupled to network 160 using infrastructure interface 151 and connector 152. Network 160 may comprise one or more of a local area network (LAN), a metropolitan area network (MAN), a wide area network (WAN), an intranet, an extranet, the Internet, the public switched telephone network (PSTN), or the like. Accordingly, infrastructure interface 151 may comprise a network interface card (NIC), a modem interface, a fiber optic interface, etcetera.

Portable information processing system 101 of the illustrated embodiment, in addition to infrastructure connection detection circuitry 110 and sensors 111 adapted to detect connection of portable information processing system 101 to infrastructure of network 160, includes network interface circuitry 120, host circuitry 130, self-contained power supply 140, and infrastructure interface 151. Network interface circuitry 120 provides a communication interface between host circuitry 130 and systems of network 160. For example, network interface circuitry 120 may comprise an Ethernet chip set or other network communication circuits, as are well known in the art, to implement protocols and signaling according to accepted industry standards facilitating inter-system communication. Host circuitry 130 provides core functionality with respect to portable information processing system 101. For example, host circuitry 130 may comprise a central processing unit (CPU), memory, an instruction set (e.g., basic input/output system (BIOS), operating system, and/or application program), and input/output to provide general purpose processing as a portable computer. Self-contained power supply 140 provides energy to components of portable information processing system 101, such as infrastructure connection detection circuitry 110, network interface circuitry 120, and host circuitry 130. Self-contained power supply 140 may, for example, comprise a rechargeable or replaceable battery, as is well known in the art. Infrastructure interface 151 provides a physical connection to network infrastructure, such as includes connector 152 that may be inserted into infrastructure interface 151, and therefore includes one or more contacts disposed to be in juxtaposition with corresponding contacts of a mating connector. For example, infrastructure interface 151 may comprise a mating interface having a modular connector, such as the RJ45 connector in wide use today, or other removable connector, such as an RJ11 connector, an RJ14 connector, a universal serial bus (USB) connector, an Institute of Electrical and Electronic Engineers (IEEE) 1394 connector, a Bayonet Neill Concelman (BNC) connector, a Threaded Neill Concelman (TNC) connector, an IDC connector, or the like.

In operation, portable information processing system 101 may utilize host circuitry 130 to provide information processing as desired by a user. The foregoing information processing may involve information communication with one or more systems external to portable information processing system 101 and, therefore, host circuitry 130 may utilize network interface circuitry 120 to exchange information with one or more systems of network 160. For example, network interface circuitry 120 and infrastructure interface 151 may comprise a NIC subsystem for providing network communications. Energy for the foregoing information processing and information communication, when portable information processing system 101 is operated in a self-contained mode, is provided by self-contained power supply 140. Self-contained power supply 140 provides a finite source of energy which, when depleted, may be replaced or replenished for further information processing and/or information communication.

Use of portable information processing system 101 often does not involve use of network interface circuitry 120. For example, when portable information processing system 101 is in mobile use, e.g., the user is away from home or office traveling, network interface circuitry 120 may remain unused for extended periods of time, although host circuitry 130 is actively being used. However, even when unused, components of network interface circuitry 120 have the propensity to draw appreciable amounts of energy from self-contained power supply 140. Accordingly, the illustrated embodiment includes infrastructure connection detection circuitry 110 to provide power management with respect to network interface circuitry 120.

Infrastructure connection detection circuitry 110 of this embodiment utilizes sensors 111 to detect when infrastructure interface 151 is coupled to network 160, such as through connector 152 of the network infrastructure. For example, sensors 111 of this embodiment detect when connector 152 is physically inserted into infrastructure interface 151. Accordingly, sensors 111 of the illustrated embodiment include probes 112 impinging into a network infrastructure receiving cavity of infrastructure interface 151 into which connector 152 is inserted when portable information processing system 101 is coupled to network 160.

Sensors 111 and their attendant probes 112 may comprise any of a number of configurations suitable for detecting physical connection of portable information processing system 101 to network 160 and providing that information to infrastructure connection detection circuitry 110. For example, sensors 111 may comprise micro-switches and probes 112 may comprise switch members thereof. Additionally or alternatively, sensors 111 may comprise photo-detection circuitry and probes 112 may comprise an optical transmitter and corresponding optical receiver. Likewise, sensors 111 may comprise magnetic flux detection circuitry and sensors 112 may comprise Hall effect devices. Accordingly, probes 112 impinging into a cavity of infrastructure interface 151 may not involve physical penetration into the cavity according to various embodiments.

Infrastructure connection detection circuitry 110 of the illustrated embodiment includes logic that accepts signals from sensors 111 and makes a determination as to whether infrastructure interface 151 is physically coupled to network infrastructure and provides control signals to one or more of network interface circuitry 120, host circuitry 130, and self-contained power supply 140 to manage power consumption by network interface circuitry 120. According to certain embodiments of the portable processing system, infrastructure connection detection circuitry 110 includes a CPU, memory, an instruction set, and input/output to provide operation as described herein. According to alternative embodiments, infrastructure connection detection circuitry 110 may be provided as dedicated purpose circuitry, such as may be comprised of application specific integrated circuitry (ASIC). Infrastructure connection detection circuitry 110 may make a determination that infrastructure interface 151 is physically coupled to network 160 when an appropriate signal is received from either or both of sensors 111, and thus provide power management control signals to network interface circuitry 120, host circuitry 130, and/or self-contained power supply 140.

For example, when connector 152 is inserted into infrastructure interface 151, probes 112 may be displaced causing switchable connections within sensors 111 to close, thereby providing logic "true" signals to infrastructure connection detection circuitry 110. According to one embodiment, a logic true signal from each of sensors 111 is used to determine that infrastructure interface 151 is physically interfaced with network 160 to avoid false positive determinations, such as may be associated with a shock causing a switchable connection of one of sensors 111 to inadvertently close. Alternative embodiments use a logic true signal from a subset of sensors 111 to determine that infrastructure interface 151 is physically interfaced with network 160 to facilitate detection in anomalous situations, such as where connector 152 is irregular or otherwise provides an imperfect interface with infrastructure interface 151 and therefore does not interact or fully interact with one or more of probes 112.

Although the foregoing examples are described with reference to switchable connections within sensors 111 being closed when connector 152 of the network infrastructure is inserted into infrastructure interface 151, certain embodiments may operate in a different manner. For example, insertion of connector 152 into infrastructure interface 151 may cause switchable connections within sensors 111 to open, sending an appropriate signal to infrastructure connection detection circuitry 110. Likewise, appropriate signals, such as the above-mentioned logic true signals, may be provided by sensors 111 without the use of switchable connections. For example, Hall effect devices may cause a predictable change in impedance when exposed to a magnetic field, such as that of a permanent magnet or that associated with metals of connector 152, to thereby cause sensors 111 to provide an appropriate signal to infrastructure connection detection circuitry 110.

Cooperation among a plurality of sensors 111 may be utilized according to certain embodiments of the portable processing system for a determination with respect to connector 152 having been inserted into infrastructure interface 151. For example, sensors 111 may comprise an optical detection circuit, wherein probe 112 of a first sensor 111 provides transmission of light energy (e.g., photo emitter) and probe 112 of a second sensor 111 provides reception of light energy (e.g., photo receiver), such that a signal relevant to determining that connector 152 of the network infrastructure is inserted into infrastructure interface 151 is provided by one of sensors 111.

Additionally or alternatively, a plurality of sensors using different types of probes may be utilized in determining when connector 152 of the network infrastructure is inserted into infrastructure interface 151. For example, an optical detector circuit may be used together with a sensor implementing a switchable connection to provide multiple techniques for determining when connector 152 is inserted into infrastructure interface 151. Such multiple techniques may be used in the alternative (e.g., to provide detection when one technique is ineffective) or in combination (e.g., to provide a high level of confidence in a determination due to multiple techniques being used in the determination).

Although the embodiment illustrated in FIG. 1 shows two sensors 111, other embodiments may implement any number of sensors determined suitable for a particular situation. For example, some embodiments of the portable processing system may implement a single sensor 111, such as in the form of a single micro-switch or magnetic reed switch, to detect when infrastructure interface 151 is physically coupled to network 160.

Embodiments of the portable processing system implement a configuration of sensors 111 and/or probes 112 which operate to detect when connector 152 is interfaced with infrastructure interface 151 without requiring special adaptation of connector 152. For example, the above-mentioned micro-switch and optical detector circuit implementations may readily be used with any number of connector configurations (e.g., RJ45 connectors) without altering connector 152 which is coupled to portable information processing system 101. Similarly, the above-mentioned Hall effect implementation may readily be used with many connector configurations (e.g., those having appreciable metal content) without altering connector 152 which is coupled to portable information processing system 101. Configurations in which connector 152 remains unaltered for implementation of the portable processing system may provide advantages in desired operation of infrastructure connection detection circuitry with already available and widely distributed network infrastructure. Of course, certain embodiments of the portable processing system may utilize a configuration of connector 152 specifically adapted to cooperate with sensors 111 and/or probes 112 for detection thereof, if desired. For example, members or detents may be disposed upon connector 152 in juxtaposition with probes 112 to facilitate detection of connector 152 when interfaced with infrastructure interface 151. Additionally or alternatively, permanent magnets or other components may be installed on or within connector 152 for cooperating with sensors 111 and/or probes 112 to facilitate detection of connector 152 when interfaced with infrastructure interface 151.

Figure 2:
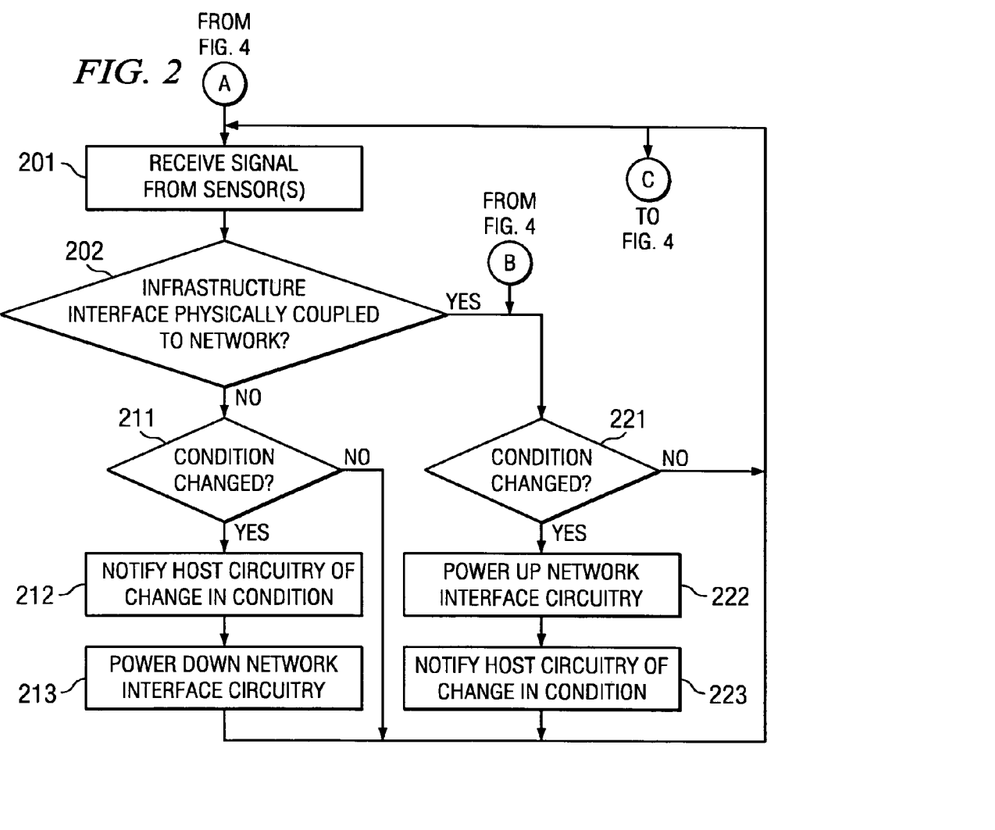
FIG. 2 shows a flow diagram of operation of the portable information processing system of FIG. 1 according to an embodiment.

FIG. 2 shows a high level flow diagram of operation of infrastructure connection detection circuitry 110 according to one embodiment. At block 201, infrastructure connection detection circuitry 110 receives a signal from one or more of sensors 111. For example, infrastructure connection detection circuitry 110 may receive a logic "true" or logic "false" signal from one or more of sensors 111 depending upon the insertion status of connector 152 within infrastructure interface 151. At block 202, infrastructure connection detection circuitry 110 determines whether infrastructure interface 151 is physically coupled to network 160. For example, algorithms of infrastructure connection detection circuitry 110 may await a logic true signal from each of sensors 111 before determining that infrastructure interface 151 is physically coupled to network 160. Alternatively, algorithms of infrastructure connection detection circuitry 110 may await a logic true signal from a predetermined number of sensors 111 before determining that infrastructure interface 151 is physically coupled to network 160. Various other detection algorithms may be implemented, such as detecting a particular pattern or order of signals received from one or more sensors, according to embodiments of the portable processing system. Moreover, multiple algorithms may be implemented, such as may be user selectable, for providing a desired level of confidence in making the foregoing determinations and/or to accommodate a variety of usage situations.

If, at block 202, it is determined that infrastructure interface 151 is not physically coupled to network 160, processing according to the illustrated embodiment proceeds to block 211. At block 211, infrastructure connection detection circuitry 110 determines whether infrastructure interface 151 not being physically coupled to network 160 represents a change in condition. If infrastructure interface 151 not being physically coupled to network 160 is not a change in condition (i.e., infrastructure interface 151 has previously been determined not to be physically coupled to network 160), processing according to the illustrated embodiment returns to block 201. However, if infrastructure interface 151 not being physically coupled to network 160 is a change in condition (i.e., infrastructure interface 151 has previously been determined to be physically coupled to network 160), processing according to the illustrated embodiment proceeds to block 212. At block 212, infrastructure connection detection circuitry 110 provides control signals to host circuitry 130 to inform host circuitry 130, or aspects thereof, of a change in condition of network interface circuitry 120. Similarly, infrastructure connection detection circuitry 110 may provide control signals to self-contained power supply 140, such as to cause self-contained power supply 140 to alter its output in response to network interface circuitry 120 (e.g., notify power supply 140 to turn off a power bus used only by network interface circuitry 120). Additionally, at block 213, infrastructure connection detection circuitry 110 provides control signals to one or more of network interface circuitry 120, host circuitry 130, and self-contained power supply 140 to implement a desired level of power management with respect to network interface circuitry 120. For example, infrastructure connection detection circuitry 110 may provide one or more control signals to network interface circuitry 120 to cause network interface circuitry 120, or aspects thereof, to power-down.

According to an embodiment of the portable processing system, control signals provided by infrastructure connection detection circuitry 110 cause network interface circuitry 120 to completely power-down and become inactive. Such an embodiment provides a maximum energy conservation configuration with respect to network interface circuitry 120 because the network interface circuitry is unpowered as if it were removed from portable information processing system 101. Signaling provided to host circuitry 130 by infrastructure connection detection circuitry 110 may indicate that network interface circuitry 120 is no longer available to avoid system errors associated with host circuitry 130 attempting information communication with or through network interface circuitry 120. Where device drivers utilized in interfacing network interface circuitry 120 with host circuitry 130 support "hot swap" or powered-up removal (e.g., PCMCIA device drivers supporting powered-up removal of PCMCIA expansion cards), infrastructure connection detection circuitry 110 may emulate powered-up removal of network interface circuitry 120, and thus its operation may appear to host circuitry 130 as if network interface circuitry 120 has been removed from portable information processing system 101.

According to another embodiment, control signals provided by infrastructure connection detection circuitry 110 cause a portion of network interface circuitry 120 to power-down. For example, according to one embodiment at least components associated with the physical layer of network interface circuitry 120 (e.g., transmit amplifiers, receive buffers, radio frequency mixers, digital-to-analog converters, and/or analog-to-digital converters) are powered-down in response to control signals from infrastructure connection detection circuitry 110. Such an embodiment may maintain registers and operational settings with respect to network interface circuitry 120 to facilitate a rapid power-up sequence in response to a power-up change in condition while achieving appreciable power conservation due to the relatively large amount of energy consumed by physical layer components. Signaling provided to host circuitry 130 by infrastructure connection detection circuitry 110 may indicate that network interface circuitry 120 is in a low power state to cause host circuitry 130 to react accordingly. For example, host circuitry 130 may slow or stop a clock or other timing signal provided to network interface circuitry 120 during operation in a low power state. Additionally or alternatively, host circuitry 130 may withhold attempting information communication with or through network interface circuitry 120 during operation in a low power state, until network interface circuitry 120 has appropriately responded to a power-up command.

Operation according to blocks 212 and 213 of embodiments of the portable processing system provides an error-free change in condition with respect to network interface circuitry 120. For example, all queues are flushed, all transactions possible are closed or otherwise gracefully terminated, and appropriate registers and logs are recorded before powering-down network interface circuitry 110 and/or notifying host circuitry 130 of the change in condition according to an embodiment of the portable processing system. Accordingly, operation of host circuitry 130 may be continued with little or no impact (perhaps without the user even being aware of the change in condition of network interface circuitry 120), although substantial power management processes have been invoked.

If, at block 202, it is determined that infrastructure interface 151 is physically coupled to network 160, processing according to the illustrated embodiment proceeds to block 221. At block 221, infrastructure connection detection circuitry 110 determines whether infrastructure interface 151 being physically coupled to network 160 represents a change in condition. If infrastructure interface 151 being physically coupled to network 160 is not a change in condition (i.e., infrastructure interface 151 has previously been determined to be physically coupled to network 160), processing according to the illustrated embodiment returns to block 201. However, if infrastructure interface 151 being physically coupled to network 160 is a change in condition (i.e., infrastructure interface 151 has not previously been determined to be physically coupled to network 160), processing according to the illustrated embodiment proceeds to block 222. At block 222, infrastructure connection detection circuitry 110 provides control signals to one or more of network interface circuitry 120, host circuitry 130, and self-contained power supply 140 to implement a desired level of recovery from power management previously invoked with respect to network interface circuitry 120. Additionally, at block 223, infrastructure connection detection circuitry 110 provides control signals to host circuitry 130 to inform host circuitry 130, or aspects thereof, of the change in condition of network interface circuitry 120. For example, infrastructure connection detection circuitry 110 may provide one or more control signals to network interface circuitry 120 to cause network interface circuitry 120, or aspects thereof, to power-up.

According to an embodiment of the portable processing system where control signals provided by infrastructure connection detection circuitry 110 cause network interface circuitry 120 to completely power-down and become inactive, power may be fully restored to network interface circuitry 120 at block 222. Signaling provided to host circuitry 130 by infrastructure connection detection circuitry 110 may indicate that network interface circuitry 120 is now available to facilitate use of network interface circuitry 120 by host circuitry 130 in conducting information communication. Where device drivers utilized in interfacing network interface circuitry 120 with host circuitry 130 support "hot swap" or powered-up installation (e.g., PCMCIA device drivers supporting powered-up installation of PCMCIA expansion cards), infrastructure connection detection circuitry 110 may emulate powered-up installation of network interface circuitry 120 and thus its operation may appear to host circuitry 130 as if network interface circuitry 120 has been installed into portable information processing system 101.

According to embodiments of the portable processing system where control signals provided by infrastructure connection detection circuitry 110 cause a portion of network interface circuitry 120 to power-down, power may be restored to such portions of network interface circuitry 120 and normal operation otherwise restored. For example, components associated with the physical layer of network interface circuitry 120 may be powered-up and a clock or other timing signal returned to a normal operating mode in response to control signals from infrastructure connection detection circuitry 110. Such an embodiment may experience a rapid power-up sequence due to registers and/or other operational settings with respect to network interface circuitry 120 having been maintained during low power operation. Signaling provided to host circuitry 130 by infrastructure connection detection circuitry 110 may indicate that network interface circuitry 120 is again in a normal operating state to cause host circuitry 130 to react accordingly. For example, host circuitry 130 may return a clock or other timing signal provided to network interface circuitry 120 to a normal operating state and may again attempt information communication with or through network interface circuitry 120.

Operation according to blocks 222 and 223 of this embodiment provides an error-free change in condition with respect to network interface circuitry 120. For example, queues are established and appropriately linked, media detection signaling and handshaking is accomplished, and appropriate registers and logs are initialized during powering-up network interface circuitry 110 and/or notifying host circuitry 130 of the change in condition according to certain embodiments. Accordingly, on-going operation of host circuitry 130 may be continued with little or no impact (perhaps without the user even being aware of the change in condition of network interface circuitry 120).

Figure 3:
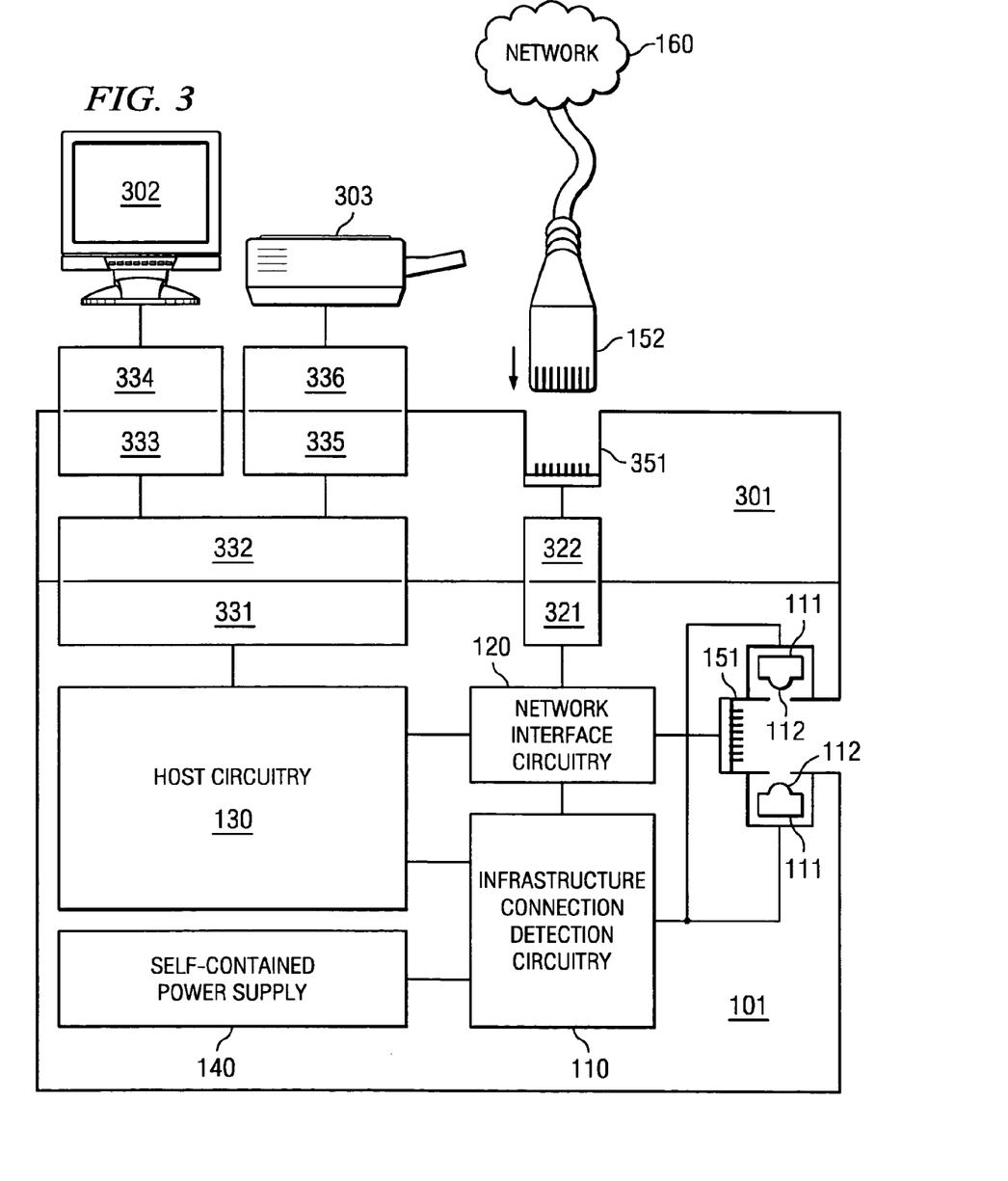
FIG. 3 shows a block diagram of a portable information processing system adapted according to another embodiment.

Although particular embodiments have been described above in order to aid the reader in understanding the concepts disclosed herein, the portable information processing system may be implemented in a variety of embodiments and/or may implement features and functions in addition to or in alternative to those described above. For example, FIG. 3 illustrates an embodiment adapted to accommodate powered-up operation of network interface circuitry 120 in particular situations where connector 152 of the network infrastructure is not interfaced with infrastructure interface 151. Additionally, the embodiment of FIG. 3 shows a sensor configuration wherein probes 112 do not physically impinge into a cavity of infrastructure interface 151. For example, sensors 111 may comprise photo-detection circuitry and probes 112 may comprise an optical transmitter and corresponding optical receiver.

In the embodiment illustrated in FIG. 3, portable information processing system 101 has been coupled to a fixed location connectivity or expansion device, often referred to as a "docking station," shown as device 301. Device 301 provides connectivity between portable information processing system 101 and external devices, such as monitor 302 and printer 303. For example, connector 331 of portable information processing system may interface with connector 332 of device 301 to provide host circuitry 130 with information communication to one or more connectivity ports, such as ports 333 and 335. In the illustrated embodiment, port 333 couples to connector 334 to complete the connectivity between monitor 302 and host circuitry 130. Similarly, port 335 couples to connector 336 to complete the connectivity between printer 303 (or other peripheral) and host circuitry 130. Using such connectivity, portable information processing system 101 may be provided enhanced or additional capabilities not available when portable information processing system 101 is operating in a self-contained mode.

In addition to providing connectivity to monitor 302 and printer 303, device 301 of the illustrated embodiment provides connectivity between portable information processing system 101 and network 160 through connectors 321 and 322, infrastructure interface 351, and connector 152. Accordingly, when docked with device 301, network interface circuitry 120 may provide a communication interface between host circuitry 130 and systems of network 160 via infrastructure interface 351. However, if infrastructure connection detection circuitry 110 were to determine that infrastructure interface 151 was not physically coupled to network 160, e.g., connector 152 of the network infrastructure is not interfaced with infrastructure interface 151, network interface circuitry 120 may be powered-down as described above, although network information communication may be conducted via infrastructure interface 351. Accordingly, the embodiment of infrastructure connection detection circuitry 110 illustrated in FIG. 3 is adapted to determine if portable information processing system 101 is coupled to device 301, or is otherwise adapted to avoid powering-down network interface circuitry 120 when an alternative infrastructure interface may be in use.

According to one embodiment of infrastructure connection detection circuitry 110 of FIG. 3, information with respect to the docked or undocked status of portable information processing system 101 with device 301 is provided by host circuitry 130 to infrastructure connection detection circuitry 110. For example, infrastructure connection detection circuitry 110 may query host circuitry 130 as to the docking status of portable information processing system 101 prior to issuing control signals to change a power condition with respect to network interface circuitry.

Figure 4:
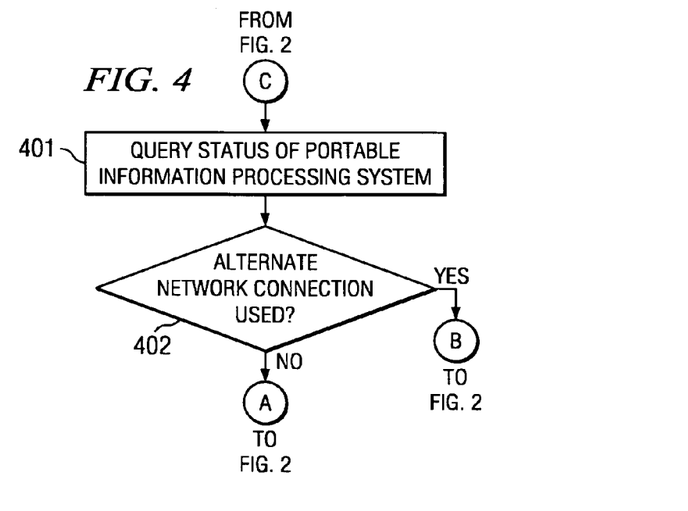
FIG. 4 shows a partial flow diagram of operation of the portable information processing system of FIG. 3 according to an embodiment.

The partial flow diagram of FIG. 4, the blocks of which would be inserted in the flow of FIG. 2 just prior to block 201, show an embodiment wherein infrastructure connection detection circuitry 110 determines the docking status of portable information processing system 101 and responds accordingly. Specifically, at block 401 infrastructure connection detection circuitry 110 queries host circuitry 130 to determine the docking status of portable information processing system 101. At block 402, infrastructure connection detection circuitry 110 determines if an alternate network connection is used (or is available for use). For example, algorithms of infrastructure connection detection circuitry 110 may determine that when portable information processing system 101 is docked with device 301, having infrastructure interface 351, an alternate network connection may be in use and therefore powering-down network interface circuitry 120 is not desirable. Accordingly, processing according to the embodiment of FIG. 4 proceeds to block 221, wherein network interface circuitry 120 is powered-up or unaltered depending upon its current condition, if it is determined that portable information processing system 101 is docked with device 301 at block 402. However, if it is determined that portable information processing system 101 is not docked with device 301 at block 402, processing proceeds to block 201 wherein processing to determine if infrastructure interface 151 is physically coupled to network 160 is provided.

The foregoing embodiment resulting in network interface circuitry 120 remaining powered-up upon a determination that portable information processing system 101 is docked with device 301 is not expected to result in unacceptable energy depletion of self-contained power supply 140 because docking station configurations typically provide a source of line power. Therefore, portable information processing system 101 will generally be operating on-line power rather than self-contained power supply 140 when docked with device 301.

Certain embodiments, however, may be configured to optimize power management under conditions such as when portable information processing system 101 is docked with device 301. For example, infrastructure connection detection circuitry 101 may implement physical layer monitoring for communication traffic and, when no communication traffic is detected for a predetermined period of time, place some circuitry of network interface circuitry 120 a low power state.

This additional technique for power management will not provide the level of energy conservation resulting from powering-down network interface circuitry 120 as described above, but may be relied upon to provide some level of power management when an alternate network interface is present.

Operation of the embodiment illustrated in FIG. 4 may query information regarding the status of portable information processing system 101 from sources in addition to or in the alternative to host circuitry 130 and/or may query information in addition to or in the alternative to docking status. For example, infrastructure connection detection circuitry 110 may query self-contained power supply 140 as to a status, such as whether recharge circuits are active (e.g., coupled to a line source) or a power reserve level, at block 401. At block 402, infrastructure connection detection circuitry may determine that an alternate network connection may be in use (or that powering-down network interface circuitry 120 is otherwise not desired), such as because self-contained power supply 140 is being recharged or has a power reserve level above a threshold value.

An alternative embodiment to that shown in FIG. 3 may include sensors, such as sensors 111, at infrastructure interface 351. Accordingly, in addition to or in the alternative to implementing the flow of FIG. 4, an embodiment of the invention may receive signals from sensors at infrastructure interface 351 in addition to those of infrastructure interface 350 (block 201 of FIG. 2). Infrastructure connection detection circuitry 110 determines if either infrastructure interface is physically coupled to network 160 (block 202 of FIG. 2).

Embodiments of the portable information processing system may implement various combinations of infrastructure connection detection and power management techniques. For example, certain embodiments may implement power management techniques in response to detecting that an infrastructure interface is physically coupled to a network as well as power management techniques in response to detecting that no information communication has been conducted via the infrastructure interface for a period of time.

Although an embodiment has been described above with reference to a NIC subsystem, network interface circuitry for which power management is provided according to certain embodiments may be disposed in configurations other than that of an expansion or other card. For example, power management may be provided with respect to network interface circuitry which is fully integrated with other circuitry of a portable information processing system, e.g., integrated onto a motherboard thereof.

Embodiments have been described above with reference to self-contained power supplies. However, power management may be provided with respect to power supplies other than those capable of providing self-contained power. For example, certain embodiments may provide power management for use with line-driven power supplies. Additionally or alternatively, power management provided according to embodiments of the portable information processing system may be implemented with respect to information processing systems for which mobility and/or portability are not an issue.

Although embodiments have been described herein with reference to physically coupling a portable information processing system to a network, the concepts disclosed herein are applicable to information communication which utilizes wireless links. For example, a network coupled to a portable information processing system adapted according to certain embodiments may utilize one or more wireless links in providing information communication to/from the portable information processing system. Additionally or alternatively, a portable information processing system adapted according to the present invention may utilize a wireless link or links information communication to/form a network. For example, an antenna assembly used with respect to a wireless network interface may be removably attached to the portable information processing system using an infrastructure interface adapted as described herein.

What is claimed is:

1. A system comprising:
a plurality of sensors for detecting when an infrastructure interface is physically coupled to network infrastructure; and
infrastructure connection detection circuitry coupled to said sensors, said infrastructure connection detection circuitry providing a power management control signal as a function of a signal from each sensor, said power management control signal being provided to a processor to request the processor to adjust operation of network interface circuitry;
wherein at least one sensor comprises a sensor selected from a group consisting of an optical detection device, a magnetic flux detection device, and a Hall effect device.

2. The system of claim 1, wherein each sensor changes switch states when said infrastructure interface is physically coupled to said network infrastructure.

3. The system of claim 1, wherein at least one sensor is said optical detection device, and said optical detection device changes states when said infrastructure interface is physically coupled to said network infrastructure.

4. The system of claim 1, wherein at least one sensor is said magnetic flux detection device, and said magnetic flux detection device changes states when said infrastructure interface is physically coupled to said network infrastructure.

5. The system of claim 1, wherein at least one sensor is disposed so that no portion thereof physically impinges upon a network infrastructure receiving cavity of said infrastructure interface.

6. The system of claim 1, wherein said infrastructure interface comprises a mating interface for a connector selected from the group consisting of:
an RJ45 connector;
an RJ11 connector;
an RJ14 connector;
a universal serial bus (USB) connector;
an Institute of Electrical and Electronic Engineers (IEEE) 1398 connector;
a Bayonet Neill Concelman (BNC) connector; and
a Threaded Neill Concelman (TNC) connector.

7. The system of claim 1, wherein said power management control signal causes at least a physical layer of the network interface circuitry, in communication with said infrastructure interface, to power-down as a function of said signal from each sensor indicating that said infrastructure interface is not physically coupled to said network infrastructure.

8. The system of claim 1, wherein said power management control signal causes the network interface circuitry, in communication with said infrastructure interface, to fully power-down as a function of said signal from each sensor indicating that said infrastructure interface is not physically coupled to said network infrastructure.

9. The system of claim 1, wherein said power management control signal causes at least a physical layer of the network interface circuitry, in communication with said infrastructure interface, to power-up as a function of said signal from each sensor indicating that said infrastructure interface is physically coupled to said network infrastructure.

10. The system of claim 1, wherein said power management control signal causes at least a physical layer of the network interface circuitry, in communication with said infrastructure interface, not to power-down as a function of said signal from each sensor indicating that said infrastructure interface is physically coupled to said network infrastructure.

11. The system of claim 10, wherein said infrastructure connection detection circuitry further provides a power management control signal as a function of monitoring information communication via said infrastructure interface.

12. The system of claim 1, wherein said power management control signal emulates the network interface circuitry having been removed from a host system.

13. The system of claim 1, wherein said power management control signal emulates the network interface circuitry having been installed into.a host system.

14. A system comprising:
network interface circuitry providing information communication between an information processing system and a network;
an infrastructure interface for coupling said network interface circuitry and said network for said information communication;
at least one sensor for detecting when said infrastructure interface is physically coupled to a mating connector, said sensor comprises a sensor selected from a group consisting of an optical detection device, a magnetic flux detection device, and a Hall effect device; and
infrastructure connection detection circuitry coupled to at least two sensors, said infrastructure connection detection circuitry providing a power management control signal as a function of a signal from each of said at least two sensors, said power management control signal being provided to a processor to request the processor to adjust operation of said network interface circuitry.

15. The system of claim 14, wherein said information processing system comprises a portable computer.

16. The system of claim 14, wherein said information processing system comprises a personal digital assistant.

17. The system of claim 14, wherein said information processing system comprises a wireless personal communication terminal.

18. The system of claim 14, wherein said information processing system comprises a cellular telephone.

19. The system of claim 14, wherein said information processing system comprises a portable information processing system.

20. The system of claim 14, wherein said infrastructure interface comprises an Ethernet interface.

21. The system of claim 14, wherein said infrastructure interface comprises a Token Ring interface.

22. The system of claim 14, wherein said infrastructure interface comprises a universal serial bus (USB) interface.

23. The system of claim 14, wherein said infrastructure interface comprises an Institute of Electrical and Electronic Engineers (IEEE) 1394 interface.

24. The system of claim 14, wherein said infrastructure interface comprises a modem interface.

25. The system of claim 14, wherein said infrastructure interface comprises a fiber optic interface.

26. A method comprising:
determining if an infrastructure interface is physically coupled to network infrastructure as a function of a sensor signal from at least two of a plurality of sensors, each sensor signal indicative of when an infrastructure interface is physically coupled to network infrastructure; and
providing a power management control signal to a processor to request the processor to alter a powered state of network interface circuitry when a condition of said infrastructure interface with respect to being physically coupled to said network infrastructure is determined to have changed;
wherein each sensor signal is from a sensor selected from a group consisting of an optical detection device, a magnetic flux detection device, and a Hall effect device.

27. The method of claim 26, further comprising:
notifying host circuitry of said alteration of said powered state of said network interface circuitry.

28. The method of claim 26, further comprising:
notifying power supply circuitry of said alteration of said powered state of said network interface circuitry.

29. The method of claim 26, further comprising:
receiving a plurality of sensor signals, and wherein said determining if said infrastructure interface is physically coupled to said network infrastructure is a function of the sensor signals from all of the plurality of sensors.

30. The method of claim 26, further comprising:
receiving a plurality of sensor signals.

31. The method of claim 26, wherein at least a portion of said network interface circuitry is powered-down in response to said power management control signal when it is determined that said infrastructure interface is not physically coupled to said network infrastructure.

32. The method of claim 26, wherein said network interface circuitry is fully powered-down in response to said power management control signal when it is determined that said infrastructure interface is not physically coupled to said network infrastructure.

33. The method of claim 26, wherein at least a portion of said network interface circuitry is powered-up in response to said power management control signal when it is determined that said infrastructure interface is physically coupled to said network infrastructure.

34. The method of claim 26, wherein said network interface circuitry is powered-up from a fully powered-down state in response to said power management control signal when it is determined that said infrastructure interface is physically coupled to said network infrastructure.

35. A system comprising:
means for detecting if an infrastructure interface is physically coupled to a mating connector, said means for detecting comprising a sensor selected from a group consisting of an optical detection device, a magnetic flux detection device, and a Hall effect device;
means for providing a power management control signal when said means for detecting indicates said infrastructure interface has changed a condition with respect to being physically coupled to said network infrastructures;
means for emulating removal of network interface circuitry from a host system in response to said power management control signal.

36. The system of claim 35, further comprising:
means for emulating installing network interface circuitry into a host system in response to said power management control signal.

37. The system of claim 35, further comprising:
means for powering-down at least a physical layer of network interface circuitry in response to said power management control signal.

38. The system of claim 35, further comprising:
means for fully powering-down network interface circuitry in response to said power management control signal.

* * * * *

UNITED STATES PATENT AND TRADEMARK OFFICE
CERTIFICATE OF CORRECTION

| | | |
|---|---|---|
| PATENT NO. | : 7,519,842 B2 | Page 1 of 1 |
| APPLICATION NO. | : 10/922099 | |
| DATED | : April 14, 2009 | |
| INVENTOR(S) | : Qijun Chen et al. | |

It is certified that error appears in the above-identified patent and that said Letters Patent is hereby corrected as shown below:

In column 14, lines 49-50, in Claim 35, delete "infrastructures;" and insert -- infrastructure; --, therefor.

Signed and Sealed this

First Day of September, 2009

David J. Kappos
*Director of the United States Patent and Trademark Office*